(12) United States Patent
Rassouli et al.

(10) Patent No.: US 7,361,391 B2
(45) Date of Patent: Apr. 22, 2008

(54) METALIZED FILM LAMINATES WITH ANTICORROSION AGENTS

(75) Inventors: Mahmood Reza Rassouli, Lebanon, PA (US); Michael Scott Hartman, Oshkosh, WI (US)

(73) Assignee: Milprint, Inc., Oshkosh, WI (US)

( * ) Notice: Subject to any disclaimer, the term of this patent is extended or adjusted under 35 U.S.C. 154(b) by 0 days.

(21) Appl. No.: 10/263,022

(22) Filed: Oct. 2, 2002

(65) Prior Publication Data

US 2004/0067375 A1    Apr. 8, 2004

(51) Int. Cl.
*B32B 1/08* (2006.01)

(52) U.S. Cl. .......... 428/34.6; 428/34.7; 428/35.3; 428/35.7; 428/35.8; 428/35.9; 428/36.6; 428/355 R; 428/356; 428/355 N

(58) Field of Classification Search .......... 428/457, 428/478, 461, 34.6, 34.7, 35.3, 35.7, 35.8, 428/35.9, 36.6, 355 R, 356, 355 N
See application file for complete search history.

(56) References Cited

U.S. PATENT DOCUMENTS

| | | | |
|---|---|---|---|
| 4,051,066 A | 9/1977 | Miksic et al. | |
| 4,275,835 A | 6/1981 | Miksic et al. | |
| 4,410,582 A | 10/1983 | Tsunashima et al. | |
| 4,686,152 A * | 8/1987 | Matsubayashi et al. | ..... 428/607 |
| 4,687,698 A * | 8/1987 | Weil et al. | ................. 428/209 |
| 4,975,315 A | 12/1990 | Bothe et al. | |
| 5,096,630 A | 3/1992 | Bothe et al. | |
| 5,112,462 A | 5/1992 | Swisher | |
| 5,118,540 A | 6/1992 | Hutchison | |
| 5,126,402 A | 6/1992 | Chou | |
| 5,153,074 A | 10/1992 | Migliorini | |
| 5,175,054 A | 12/1992 | Chu | |
| 5,206,051 A | 4/1993 | Theisen et al. | |
| 5,209,869 A | 5/1993 | Miksic et al. | |
| 5,292,563 A | 3/1994 | Peiffer et al. | |
| 5,422,187 A | 6/1995 | Miksic et al. | |
| 5,480,690 A | 1/1996 | Stenger et al. | |
| 5,715,945 A | 2/1998 | Chandler | |
| 5,728,467 A | 3/1998 | Watanabe et al. | |
| 5,830,548 A | 11/1998 | Andersen et al. | |
| 5,855,975 A | 1/1999 | Miksic et al. | |
| 5,922,471 A | 7/1999 | Chatterjee | |
| 5,937,618 A | 8/1999 | Chandler | |
| 5,958,115 A | 9/1999 | Bottcher et al. | |
| 6,033,599 A * | 3/2000 | Lozano et al. | ......... 252/389.54 |
| 6,033,786 A | 3/2000 | Fatica et al. | |
| 6,214,422 B1 | 4/2001 | Yializis | |
| 6,221,198 B1 | 4/2001 | Gryska et al. | |
| 6,235,102 B1 * | 5/2001 | Parekh et al. | .......... 106/287.22 |
| 6,274,228 B1 | 8/2001 | Ramesh et al. | |
| 6,294,594 B1 | 9/2001 | Borja et al. | |
| 6,346,321 B1 | 2/2002 | Stober et al. | |
| 6,350,794 B1 | 2/2002 | Borja | |
| 6,368,720 B1 | 4/2002 | Matsui et al. | |
| 6,410,124 B1 | 6/2002 | Peet | |
| 6,420,041 B1 | 7/2002 | Amon et al. | |
| 6,464,899 B1 * | 10/2002 | Haas et al. | ............. 252/389.1 |
| 6,465,065 B1 * | 10/2002 | Teumac et al. | ............ 428/35.7 |
| 6,533,962 B1 | 3/2003 | Tulka et al. | |
| 6,576,343 B2 * | 6/2003 | Parekh et al. | ............... 428/418 |
| 2001/0053449 A1 * | 12/2001 | Parekh et al. | ............... 428/458 |
| 2002/0150689 A1 * | 10/2002 | Seibel et al. | ............. 427/407.1 |
| 2003/0031583 A1 * | 2/2003 | Reinhard et al. | ............. 422/10 |

FOREIGN PATENT DOCUMENTS

| | | | |
|---|---|---|---|
| DE | 3417149 | * | 5/1984 |
| FR | 22470068 | * | 6/1975 |

* cited by examiner

*Primary Examiner*—Leszek Kiliman
(74) *Attorney, Agent, or Firm*—Christine E. Benter

(57) ABSTRACT

Multilayered laminate films for food packaging applications which comprise at least: (a) a layer of oriented or nonoriented polyester terephthalate or oriented or nonoriented polypropylene, (b) a layer comprising at least one metal, and (c) a layer comprising at least one additive suitable for incidental food contact which provides protection against corrosion to a layer containing at least one metal is described.

45 Claims, 3 Drawing Sheets

METALIZED FILM LAMINATES WITH ANTICORROSION AGENTS

BACKGROUND OF THE INVENTION

The present invention relates to metalized film laminates for packaging material applications which are corrosion resistant and are suitable for packaging food items.

In the field of packaging materials for food products, a metalized film layer has often served as a barrier against moisture and oxygen. For example, U.S. Pat. No. 5,096,630 to Bothe et al. disclose a method for producing a multilayered film which comprises a metalizable polypropylene surface for use with packaging food products. U.S. Pat. No. 5,153,074 to Migliorini discloses a film suitable for use as containers for foods comprising a metalized ethylene vinyl alcohol coated polypropylene layer which provides unexpected moisture barrier characteristics. Additionally, U.S. Pat. No. 5,206,051 to Theisen et al. disclose a process for producing an improved packaging film for food having low permeability to water vapor by metalizing the surface of a polypropylene/acid terpolymer blend. U.S. Pat. No. 5,728,467 to Watanabe et al. disclose a multilayered laminate having good gas barrier properties as a result of a film of metal formed on a surface of various plastic substrates.

Metalized film surfaces are susceptible to corrosion. This occurs when the metal comes in contact with water vapor from sources such as the environment, food items enclosed within the package or residual moisture introduced during the manufacturing process and/or from the materials used in the construction of the package. Among the common indications of corrosion manifested in metalized packaging films are oxidation, pitting, tarnishing, mottling, or discolorations. Corrosion of metalized film surfaces, such as metallic aluminum for example, can destroy the barrier properties of the package leaving it no longer useful as a packaging material for food. Uninhibited corrosion can be very destructive to both the package and its contents; resulting in actual material loss in the package, deterioration of the flavor and aroma components in food, and substantial decrease of the shelf-life of the product.

Corrosion inhibiting formulations for preventing corrosion of metal layers in plastic packaging materials have been reported. U.S. Pat. Nos. 5,209,869, 5,320,778, 5,344,589 and 5,422,187, all issued to Miksic, disclose vapor corrosion inhibitor/desiccant formulations. The inhibitors described in these four related patents are selected from formulations comprising anhydrous molybdates mixed with benzotriazole and sodium nitrite or from a formulation comprising amine benzoate, amine nitrates and benzotriazole. These patents disclose that the formulations can be incorporated into laminates containing a central metal layer. The film laminates find particular application in the formation of enclosures about metallic articles susceptible to corrosion, and provide a relatively dry corrosion inhibiting atmosphere therein.

Alternatively, U.S. Pat. No. 5,958,115 to Bottcher et al., discloses a method of producing corrosion-protective packaging materials in which one or more corrosion inhibitors are distributed into a metal oxide gel matrix which is modified with an organic polymer into a coating that is applied to paper or plastic. The corrosion inhibiting agent comprises phenols, hydroquinones, nitrites, organic acids, amines, amides, thiazoles, triazoles, imidazoles and mixtures thereof. The materials made according to this method are said to be suitable for producing corrosion-protective packaging materials for coating metallic or metalized articles.

Also, U.S. Pat. No. 6,033,599 to Lozano et al., discloses a corrosion inhibiting composition which includes a combination of inhibiting components comprising an alkali metal nitrite, an alkali metal benzoate and an alkali metal molybdate. The corrosion inhibiting compositions are incorporated within plastic wrapping materials in the form of laminated or blown films. The laminates and/or films are described as particularly useful for packaging corrodible metal articles.

It is of foremost importance when preparing corrosion-resistant metalized film laminates suitable material for food packaging applications, to consider the toxicity of the corrosion inhibiting agent. Many of the anticorrosion compounds and compositions described in the patents above contain nitrites, chromates, amines, phenols, hydroquinones, amides, thiazoles, triazoles, imidazoles and molybdates. Although these types of compounds are effective anticorrosion agents, it is known that chromates, phenols and combinations including amines and nitrites are deleterious to health. Furthermore, most of these compounds have not been approved for incidental food contact as required by law.

SUMMARY OF THE INVENTION

The present invention is a film laminate having multiple layers where at least one overlacquer or adhesive layer prevents the loss of barrier properties of at least one layer comprising at least one metal by incorporation of anticorrosion additives into said overlacquer or adhesive layer.

It is an object of the present invention to provide a laminate film suitable for incidental food contact comprising a first layer which prevents the loss of barrier properties of the film and is free of polyvinyl alcohol and polyamide, a second layer of metal and a third layer of polymeric material where the third layer may comprise polyester or polypropylene and is free of low-molecular weight hydrocarbon resin.

In another aspect the invention provides a laminate film suitable for incidental food contact comprising a first layer which prevents the loss of barrier properties of the film and is free of polyvinyl alcohol and polyamide, a second layer of metal, a third layer of polymeric material, and fourth layer of polymeric material wherein the third and fourth layers may comprise polyester or polypropylene and are free of low-molecular weight hydrocarbon resin.

In another aspect, the invention provides a laminate film suitable for incidental food contact comprising a first layer which prevents the loss of barrier properties of the film and is free of polyvinyl alcohol and polyamide, a second layer of metal, a third of polymeric material, a fourth layer of polymeric material wherein the third and fourth layers may comprise polyester or polypropylene and are free of low-molecular weight hydrocarbon resin, and a fifth layer of metal.

BRIEF DESCRIPTION OF THE DRAWINGS

These and other objects of this invention will become apparent from the following detailed description wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

Figure 1:
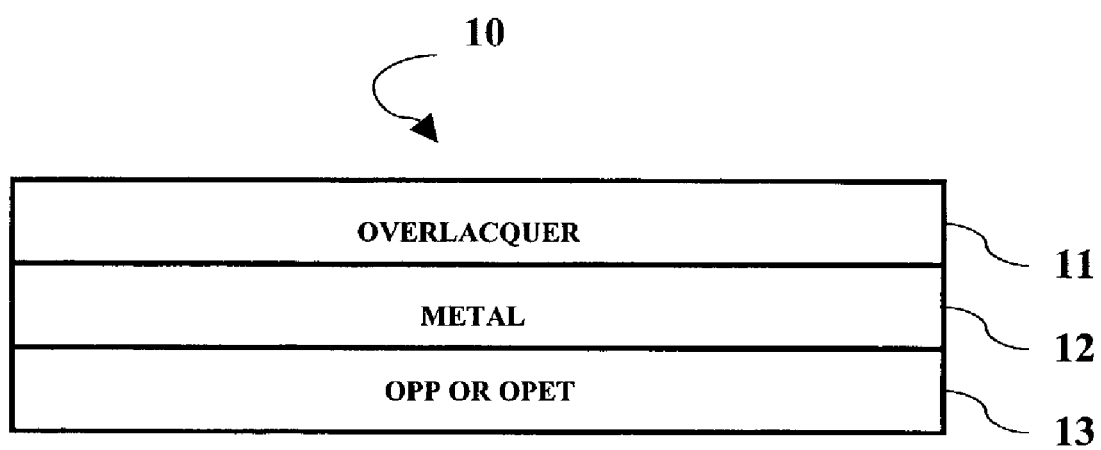
FIG. 1 is an enlarged cross-sectional view of one embodiment of the laminate film 10 comprising a metallic layer 12, a polymeric layer 13 which functions as a substrate for deposition of layer 12, and a layer 11 protecting metallic layer 12 in the form of an overlacquer.
Figure 2:
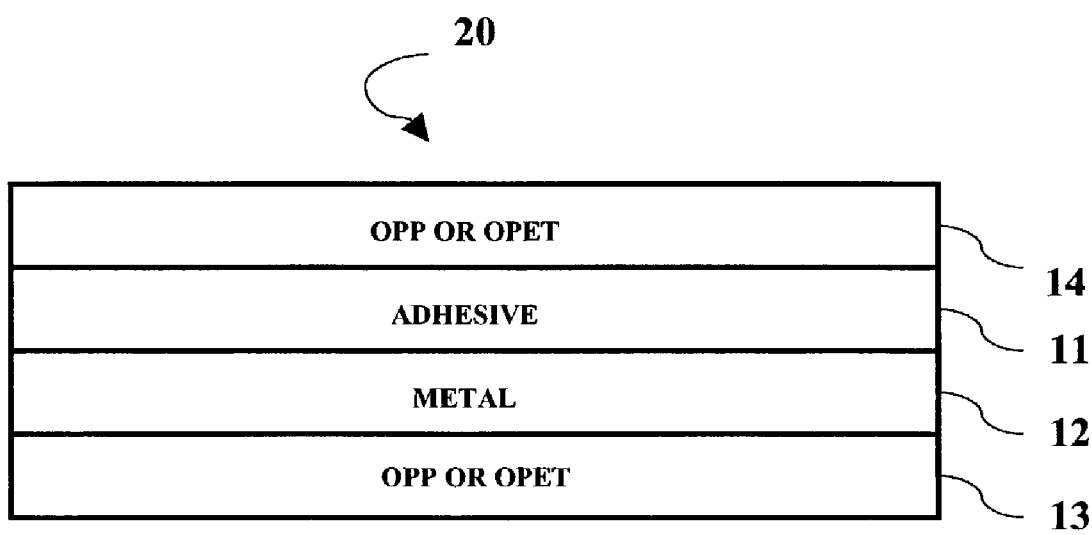
FIG. 2 is an enlarged cross-sectional view of a preferred embodiment of the laminate film 20 comprising in addition to a metallic layer 12 and a polymeric layer 13 which functions as a substrate for deposition of layer 12, a layer 11 protecting metallic layer 12 and bonding a fourth layer of polymeric material 14 to film 20 in the form of an adhesive.

With reference to the drawings, FIG. 1 shows the three-layer form of the improved metalized laminates with anticorrosion agents described by the numeral 10. FIG. 2 shows a four-layer form of the present invention described by numerical 20 and FIG. 3 shows a five-layer form of the present invention described by numeral 30.

Figure 3:
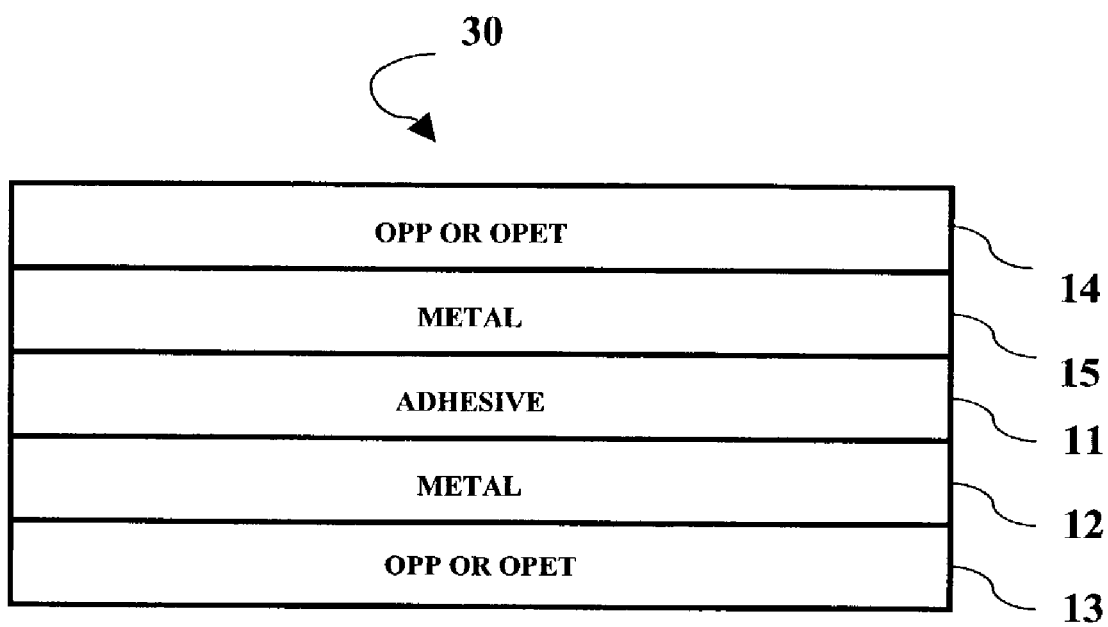
FIG. 3 is an enlarged cross-sectional view of another preferred embodiment of laminate film 30 comprising metallic layers 12 and 15, a polymeric layer 13 and 14 which function as a substrate for deposition of layer 12 and layer 15, respectively, and a layer 11 protecting metallic layers 12 and 15, and further bonding metallic layers 12 and 15 together in the form of an adhesive.

With respect to the examples illustrated in FIGS. 1-3, a thin layer of aluminum 12 is vapor deposited onto a flexible thermoplastic support layer 13. There is further illustrated in FIG. 3 an additional thin layer of aluminum 15 which is vapor deposited onto a flexible thermoplastic support layer 14. Layers 13 and 14 may comprise any metallizable thermoplastic which may include polyolefin resins such as polyethylene, polypropylene, polyisoprene, polybutene, poly-3-methylbutene-1, poly-4-methylpentene-1, polybutadiene, polystyrene and copolymers of constituent monomers of the foregoing polymers (e.g. ethylene/propylene copolymer, linear low density polyethylenes containing butene-1, 4-methylpentene-1, hexene-1, octene-1, or the like as a comonomer, block copolymer of propylene/ethylene, styrene/butadiene copolymer, mixtures, graft products, cross-linked products, block copolymer, etc. of these resins), ethylene/vinyl acetate copolymer and its saponification products, halogen-containing polymers (e.g. polyvinylidene chloride, polyvinyl chloride, polyvinyl fluoride, polyvinylidene fluoride, polychloroprene, chlorinated rubber, etc.), polymers of unsaturated carboxylic acids and their derivatives (e.g. polyalkyl methacrylate, polyalkyl acrylate, polyacrylonitrile, copolymers of constituent monomers of the foregoing polymers with other monomers, such as acrylonitrile/styrene copolymer, ABS resins, ethylene/alkyl acrylate copolymer, ethylene/glycidyl methacrylate copolymer, ethylene/methacrylic acid copolymer and its ionic cross-linked products, etc.), polyacetal, polycarbonate, polyester (e.g. polyethylene terephthalate, polybutylene terephthalate, polybutylene terephthalate, polyethylene naphthalate, etc.), polyamide, polyphenylene oxide, polysulfone, etc. Among these thermoplastic resins, polypropylene and polyethylene terephthalate are preferably used for the support layer 13 and 14. According to this invention, the most preferable resins are biaxially oriented polypropylene (OPP) and biaxially oriented polyethylene terephthalate (OPET).

The metal layers 12 and 15 can be composed of any suitable metal. Layers may be simple metals such as aluminum, titanium, chromium, nickel, zinc, copper, bronze, gold, silver, or alloys thereof, or metal oxides such as aluminum oxide, silicon oxide, ferrite, indium oxide, etc. The preferred metal comprises aluminum or aluminum-containing alloys. These metals and metal oxides can be deposited as a layer on the surface of the substrate according to a known procedure such as electroplating, sputtering and vacuum vapor-deposition, with vacuum vapor-deposition being preferred method.

The thickness of the metal layers 12 and 15 can be about 20 to 1000 Angstroms, preferably about 200 Angstroms.

Referring to FIG. 1 of the drawing, layer 11 functions as an protective over-lacquer for film 10. Referring to FIG. 2, layer 11 is an adhesive which bonds the surface of metal layer 12 to the surface of layer 14. Referring now to FIG. 3, layer 11 is an adhesive bonding the surface of layer 12 to the surface of layer 15.

The composition of layer 11 for the three embodiments illustrated in FIGS. 1-3 may comprise a blend of at least one anticorrosion additive with any conventional adhesive formulation designed for use in food packaging applications. Layer 11 in the present invention may include radiation curable or heat-curable adhesives, pressure sensitive adhesives, hot melt adhesives or water-soluble adhesives. The composition of the adhesive may comprise polymers such as, polyacrylates, acrylic latex, polyurethanes, polyamides, reaction products of polyamide with vegetable oil acids, epoxies, ethyleneamines, polysiloxanes, silicone rubber, polyalkylene glycols, polyesters, sulfopolyesters, etc. Among these adhesives, water-based acrylic latex and polyurethane are preferably used for layer 11. The water-based acrylic latex preferably is a one-component adhesive with a percent solids content of 50%, a pH of 6.5, a storage life of six months and is available from Worthen Industries, Inc., Richmond, Va., U.S.A., and sold under the name UNOVERS 5426. The water-soluble acrylic latex is preferably a two-component adhesive system having a solids content of between 40% to 67%, a pH of between 7.0 to 7.5, a storage life of at least six months and is available from Sovereign Specialty Chemicals, Buffalo, N.Y., U.S.A., and sold under the trademark of AVADYNE® AV1254/CA100.

In accordance with the present invention, the composition of layer 11 generally comprises an anticorrosion additive between 0.005% (by weight) to 60% (by weight) with respect to final composition, and preferably, between 0.05% (by weight) to 5% (by weight). The anticorrosion additive may comprises any anticorrosion compound which is suitable for incidental food contact. Incidental food contact is defined as those materials which comply with the criteria as outlined by the United States Food and Drug Administration in their standard FDA 175.150 for incidental food contact which is incorporated herein by reference. Examples of suitable anticorrosion additives may include alkali metal benzoate or salts of sebacic acid. In the presently preferred embodiment, the anticorrosion additive comprises sodium benzoate or disodium sebacate. Disodium sebacate is a compound having a density of 1.42 g/cm$^3$ a melting point greater than 200° C., a particle size distribution less than 24 microns and is commercially available from Ciba Specialty Chemicals, Inc., Tarrytown, N.Y., U.S.A. and sold under the trademark of IRGACOR® DSS G.

For production, the incorporation of the anticorrosion additive into the adhesive begins with the slow continuous addition of about 110 pounds of anticorrosion additive to a mixing drum containing about 227 pounds of water while constantly stirring the contents using a single or double-bladed propeller. After the addition of the additive is complete, the mixture is stirred for 30 minutes or until the anticorrosion additive is completely dissolved in the water. About 8 pounds of the additive/water blend is then slowly added to a mixing vessel containing about 460 of adhesive and continuously stirred until the addition is complete. The resulting blend is an adhesive/anticorrosion/water mixture.

EXAMPLES

Table 1 contains various examples of three-layered, four-layered and five-layered metalized laminate film structures according to the present invention.

Symbols for the metal and overlacquer/adhesive components:
A: Aluminum
B: urethane based
C: acrylic based

TABLE 1

Metalized Film Laminate Structures

|           | Layer 11 | Layer 12 | Layer 13 | Layer 14 | Layer 15 |
|-----------|----------|----------|----------|----------|----------|
| Example 1a | B | A | OPP  |      |   |
| Example 1b | B | A | OPET |      |   |
| Example 2a | B | A | OPP  | OPET |   |
| Example 2b | C | A | OPET | OPP  |   |
| Example 2c | C | A | OPET | OPET |   |
| Example 2d | B | A | OPP  | OPP  |   |
| Example 3a | B | A | OPET | OPET | A |
| Example 3b | B | A | OPP  | OPP  | A |
| Example 3c | C | A | OPP  | OPET | A |
| Example 3d | C | A | OPET | OPP  | A |

Preparation of Metalized Film Laminates

Multilayered laminate films according to the present invention may be manufactured using any conventional glue or extrusion lamination process. Preferably, the laminate films may be produced by a glue lamination process using equipment, for example, supplied by Paper Converting Machine Company, Green Bay, Wis., U.S.A. This process begins with placing a primary roll of film on the unwind shaft. The primary film may pass through a corona treater which is, in essence, an electric current that changes the surface of the film, allowing stronger bonding between the film and adhesive.

Referring to FIGS. 1-3, the primary film is a combination comprising layer 12 and layer 13 and may be a commercially available metalized biaxially oriented polyester terephthalate or metalized biaxially oriented polypropylene. The metalized biaxially oriented polyester terephthalate has a typical total thickness between 0.45 mils to 0.75 mils, preferably, between 0.55 mils and 0.65 mils. Metalized oriented polyester terephthalate is commercially available from Mitsubishi Polyester Film, LLC, Greer, S.C., U.S.A. and sold under the trademark HOSTAPHAN® Metalized 2BCR or from Curwood, Inc., Oshkosh, Wis., U.S.A. and sold as metalized polyester 3648. The metalized biaxially oriented polypropylene has a typical total thickness between 0.55 mils to 0.90 mils, preferably, between 0.70 mils and 0.80 mils. Metalized oriented polypropylene is available from Applied Extrusion Technologies, Inc., New Castle, Del., U.S.A. and sold under the trademark AET® MXT Polypropylene or from ExxonMobil Chemical Company, Macedon, N.Y., U.S.A. and sold under the trademark METALLYTE™ TSPM.

Alternatively, the primary film may be produced as a combination of layer 13 and layer 12 by metalization of an oriented polyester terephthalate or an oriented polypropylene. Metalization preferably is done by vacuum vapor-deposition. The film is passed over a source of metal vapor, preferably aluminum, with the surface of the film facing the source of the metal vapor. The metal vapor condenses on the film and produces a thin coating of metal on the layer of film. The film is cooled by contact with water and the film is rewound into a roll for use as a primary roll of film in the lamination process.

The oriented polyester terephthalate according to the present invention preferably has a tensile strength of 32,000 in$^2$/lb (machine direction), water vapor transmission rate (0.48 mils) of 2.8 g/100 in$^2$/24 hr, yield strength of 15,000 psi (machine direction), and is available from Mitsubishi Polyester Film, LLC, Greer, S.C., and sold under the trademark HOSTAPHAN® 2BCR or from Curwood, Inc., Oshkosh, Wis., U.S.A. and sold as Polyester 3648. Oriented polypropylene preferably has a tensile strength of at least 20,000 in$^2$/lb (machine direction), water vapor transmission rate (0.60 mils) of 0.54 g/100 in$^2$/24 hr, yield strength of 50,700 psi (machine direction), and is commercially available from Applied Extrusion Technologies, Inc., New Castle, Del., U.S.A. and sold under the trademark AET® RCL Polypropylene or from ExxonMobil Chemical Company, Macedon, N.Y., U.S.A. and sold under the trademark BICOR® CSR-2.

After the primary film is placed on the unwind shaft, the film unwinds and passes through a coating trough where a controlled amount of the adhesive/anticorrosion/water mixture is applied to metal surface of the primary film. The resulting film then progresses to a drying oven heated to a temperature of between 130° F. to 350° F. where heat is used to evaporate the water in the adhesive/anticorrosion mixture, while the adhesive/anticorrosion remains.

With reference to FIG. 1, the newly dried film is cooled by two cooling rolls before progressing to the windup roll. Complete curing of the adhesive/anticorrosion mixture may take from 1 to 3 days, but can vary according to the film laminates's end use. At this point, film laminate as illustrated in structure 10 is complete and ready for testing.

With reference to FIGS. 2-3, the newly dried film is further processed with a secondary film. The secondary film is layer 14 of structure 20 which may comprise an oriented polyester terephthalate or an oriented polypropylene. Or alternatively, the secondary film is a combination of layer 14 and layer 15 of structure 30 which may comprise a metalized oriented polyester terephthalate or metalized oriented polypropylene. The secondary film may have similar physical properties and performance characteristics as those of the primary film as previously mentioned and are commercially available from the same suppliers as mentioned hereinbefore.

The primary and secondary films are pressed together by a laminating nip, made up of the nip roll and laminating drum. The laminating drum is heated to approximately 140° F. to 160° F. to where the primary and secondary films are bonded together by heat and pressure of the films against the laminating drum. The resulting film laminate is then cooled by two cooling rolls, before progressing to the windup roll.

After the lamination process is complete, the film laminate 20 or 30 is isolated and allowed to cure. As mentioned previously, complete curing may take from 1 to 3 days depending on the film laminate's end use.

To determine the effectiveness of the metalized film laminates, flat film samples containing different amounts of sodium benzoate were tested for water vapor transmission rates using a Permatran W® 3/31 Water Vapor Transmission Tester. The results of this test are provided in Table 2. Test samples were laminate films having the following components with reference to structure 20 in FIG. 2:

Layer 11: Acrylic based adhesive
Layer 12: Aluminum
Layer 13: OPET
Layer 14: OPP

TABLE 2

Water Vapor Permeation Analysis
Permeation Values x $10^{-2}$/Hours$^a$

| Additive | 3 | 24 | 36 | 48 | 72 | 96 | 120 | 144 | WVTR$^b$ |
|---|---|---|---|---|---|---|---|---|---|
| 0%-Dry | 1.4 | 1.8 | 2.0 | 2.5 | 3.4 | 4.4 | 5.5 | 6.2 | 6.6 |
| 0%-Wet | 20.3 | 20.3 | 20.1 | 20.2 | 21.5 | 21.2 | 21.1 | 21.8 | 22.0 |
| 1%-Dry | 0.9 | 1.3 | 1.5 | 1.6 | 1.8 | 2.1 | 2.4 | 2.6 | 2.7 |
| 1%-Wet | 1.2 | 1.3 | 1.2 | 1.3 | 1.2 | 1.4 | 1.4 | 1.4 | 1.4 |
| 5%-Dry | 0.9 | 1.0 | 1.1 | 1.1 | 1.1 | 1.2 | 1.1 | 1.1 | 1.1 |
| 5%-Wet | 2.6 | 2.5 | 2.5 | 2.5 | 2.6 | 2.6 | 2.7 | 2.7 | 2.7 |
| 10%-Dry | 1.3 | 1.5 | 1.7 | 1.5 | 1.7 | 1.7 | 1.9 | 1.9 | 1.9 |
| 10%-Wet | 4.3 | 4.3 | 4.3 | 4.2 | 4.0 | 4.1 | 4.6 | 4.5 | 4.5 |

Hours$^a$ are approximate times.
WVTR$^b$ = (gm/100 in$^2$/day).

Unless otherwise noted, the physical properties and performance characteristics reported hereinbefore were measured by test procedures similar to the following methods.

| | |
|---|---|
| Tensile Strength: | ASTM D 882 |
| Yield Strength: | ASTM D 882 |
| Density | ASTM D 1505 |
| Percent Solids Content: | ASTM D 2832 (1999) |
| pH: | ASTM D 1293-99 |
| Water Vapor Transmission Rate: | ASTM F 1249 |

All ASTM test methods noted herein are incorporated by reference into this disclosure.

What is claimed is:

1. A film laminate comprising:
   (a) a first layer comprising a polymer adhesive resin and an anticorrosion additive comprising an alkali metal salt selected from the group consisting of benzoates, sebacates and blends thereof, wherein said first layer is free of polyvinyl alcohol and polyamide;
   (b) a second layer formed as a coating comprising a metal or metal oxide comprising aluminum, zinc, nickel, copper, bronze, gold, silver or alloys thereof; wherein said second layer is in direct contact with said first layer
   (c) a third layer comprising a polymer resin; wherein said third layer is essentially free of low-molecular weight hydrocarbon resin;

wherein said first layer prevents the loss of the barrier properties of said second layer such that said laminate has a water vapor transmission rate of less than 22 gm./100 in.$^2$/24 hours as measured in accordance with ASTM 1249 test method; and wherein said laminate is suitable for incidental food contact.

2. A film laminate according to claim 1; wherein said third layer comprises a polyester or polyolefin.

3. A film laminate according to claim 2; wherein said polyester is polyester terephthalate.

4. A film laminate according to claim 2; wherein said polyolefin is polypropylene.

5. A film laminate according to claim 1, wherein said first layer comprises an acrylic or urethane based resin.

6. A film laminate according to claim 1; wherein said additive comprises between 0.00 5% (wt.) to 60% (wt.) of said first layer.

7. A film laminate according to claim 6; wherein said additive comprises between 0.05% (wt.) to 5% (wt.) of said first layer.

8. A film laminate according to claim 1; wherein said additive is suitable for incidental food contact.

9. A film laminate according to claim 1; wherein said additive is not a chromate, amine, nitrite, or mercaptan.

10. A film laminate according to claim 1, wherein said coating is formed by a method comprising sputtering, electroplating, or vacuum vapor-deposition.

11. A film laminate according to claim 1, wherein said coating is formed on a first surface of said third layer.

12. A film laminate according to claim 1, wherein said laminate further comprises a fourth layer of a polymer resin wherein said fourth layer is essentially free of low-molecular hydrocarbon resin.

13. A film laminate according to claim 12; wherein said resin comprises a polyester or polyolefin.

14. A film laminate according to claim 13, wherein said polyester is polyester terephthalate.

15. A film laminate according to claim 13; wherein said polyolefin is polypropylene.

16. A film laminate according to claim 12, wherein said fourth layer is adjacent to said first layer.

17. A film laminate according to claim 16, wherein said laminate further comprises a fifth layer comprising at least one metal.

18. A film laminate according to claim 17, wherein said fifth layer is adjacent to said fourth layer.

19. A film laminate according to claim 16 or 18, wherein said fourth layer is in direct contact with a second surface of said first layer or a first surface of said fifth layer.

20. A film laminate according to claim 17, wherein said fifth layer is formed as a coating.

21. A film laminate according to claim 20, wherein said coating is formed by a method comprising electroplating, sputtering, or vacuum vapor-deposition.

22. A film laminate according to claim 20, wherein said coating is formed on a first surface of said fourth layer.

23. A film laminate comprising:
   (a) a first layer comprising a polymer adhesive resin and an anticorrosion additive comprising an alkali metal salt selected from the group consisting of benzoates, sebacates and blends thereof; wherein said first layer is free of polyvinyl alcohol and polyamide;
   (b) a second layer formed as a coating comprising a metal or metal oxide comprising aluminum, zinc, nickel, copper, bronze, gold, silver or alloys thereof; wherein said second layer is in direct contact with said first layer;

(c) a third layer comprising a polymer resin;

(d) a fourth layer comprising a polymer resin;

wherein said third layer and fourth layer are essentially free of low-molecular weight hydrocarbon resin;

wherein said first layer prevents the loss of the barrier properties of said second layer such that said laminate has a water vapor transmission rate of less than 22 gm./100 in.$^2$/24 hours as measured in accordance with ASTM 1249 test method; and said laminate is suitable for incidental food contact.

24. A film laminate according to claim 23; wherein said third layer comprises a polyester or polyolefin.

25. A film laminate according to claim 24; wherein said polyester is polyester terephthalate.

26. A film laminate according to claim 24; wherein said polyolefin is polypropylene.

27. A film laminate according to claim 23, wherein said first layer comprises an acrylic or urethane based resin.

28. A film laminate according to claim 23; wherein said additive comprises between 0.005% (wt.) to 60% (wt.) of said first layer.

29. A film laminate according to claim 28; wherein said additive comprises between 0.05% (wt.) to 5% (wt.) of said first layer.

30. A film laminate according to claim 23; wherein said additive is suitable of incidental food contact.

31. A film laminate according to claim 23; wherein said additive is not a chromate, amine, nitrite, or mercaptan.

32. A film laminate according to claim 23, wherein said coating is formed by a method comprising electroplating, sputtering, or vacuum vapor-deposition.

33. A film laminate according to claim 23, wherein said coating is formed on a first surface of said third layer.

34. A film laminate according to claim 23, wherein said fourth layer is adjacent to said first layer.

35. A film laminate according to claim 23, wherein said laminate further comprises a fifth layer comprising at least one metal.

36. A film laminate according to claim 35, wherein said fifth layer is adjacent to said fourth layer.

37. A film laminate according to claim 34 or 36; wherein said fourth layer is in direct contact with a second surface of said first layer or a first surface of said fifth layer.

38. A film laminate according to claim 35, wherein said fifth layer is formed as a coating.

39. A film laminate according to claim 38, wherein said coating is formed by a method comprising electroplating, sputtering, or vacuum vapor-deposition.

40. A film laminate according to claim 38, wherein said coating is formed on a first surface of said fourth layer.

41. A film laminate according to claim 38, wherein said coating comprises a metal or metal oxide comprising aluminum, zinc, nickel, copper, bronze, gold, silver or alloys thereof.

42. A film laminate comprising;

(a) a first layer comprising an acrylic or urethane resin and an anticorrosion additive wherein said first layer is free of polyvinyl alcohol and polyamide;

(b) a second layer formed as a coating comprising a metal or metal oxide comprising aluminum, zinc, nickel, copper, bronze, gold, silver or alloys thereof;

(c) a third layer comprising polyester terephthalate or polypropylene;

(d) a fourth layer comprising polyester terephthalate or polypropylene wherein said third layer and fourth layer are essentially free of low-molecular weight hydrocarbon resin;

wherein said first layer prevents the loss of the barrier properties of said second layer such that said laminate has a water vapor transmission rate of less than 22 gm./100 in.$^2$/24 hours as measured in accordance with ASTM 1249 test method; and said laminate is suitable for incidental food contact.

43. A film laminate suitable for food packaging comprising:

(a) a first anticorrosion layer comprising an alkali metal salt of benzoate or sebacate; wherein said first layer is free of polyvinyl alcohol and polyamide;

(b) a second layer formed as a coating comprising a metal or metal oxide comprising aluminum, zinc, nickel, copper, bronze, gold, silver or alloys thereof;

(c) a third layer comprising a polymer resin wherein said third layer is essentially free of low-molecular weight hydrocarbon resin; and wherein said first layer prevents the loss of the barrier properties of said second layer such that said laminate has a water vapor transmission rate of less than 22 gm./100 in.$^2$/24 hours as measured in accordance with ASTM 1249 test method.

44. A film laminate according to claim 43, further comprising a fourth layer of an ester or olefin wherein said third layer is essentially free of low-molecular weight hydrocarbon resin.

45. A film laminate according to claim 43, further comprising a fifth layer of at least one metal.

* * * * *

UNITED STATES PATENT AND TRADEMARK OFFICE
CERTIFICATE OF CORRECTION

| | | |
|---|---|---|
| PATENT NO. | : 7,361,391 B2 | Page 1 of 1 |
| APPLICATION NO. | : 10/263022 | |
| DATED | : April 22, 2008 | |
| INVENTOR(S) | : Mahmood Reza Rassouli et al. | |

It is certified that error appears in the above-identified patent and that said Letters Patent is hereby corrected as shown below:

In the specification,

In column 4, line 19, delete "an" and insert -- a --.

In column 4, line 53, delete "comprises" and insert -- comprise --.

In column 5, line 10, delete "460 of" and insert -- 460 pounds of --.

In the claims,

In column 10, line 9, in claim 42, insert -- comprising an alkali metal salt selected from the group consisting of benzoates, sebacates and blends thereof wherein -- after "additive".

In column 10, line 17, in claim 42, delete "polypropylene" and insert -- polypropylene; --.

In column 10, line 28-30, in claim 43, delete "a first anticorrosion layer comprising an alkali metal salt of benzoate or sebacate; wherein said first layer is free of polyvinyl alcohol and polyamide;" and insert -- a first anticorrosion layer comprising an anticorrosion additive comprising an alkali metal salt selected from the group consisting of benzoates, sebacates and blends thereof; wherein said first layer is free of polyvinyl alcohol and polyamide; --.

Signed and Sealed this
Eighth Day of March, 2016

Michelle K. Lee
*Director of the United States Patent and Trademark Office*